United States Patent [19]

von Ballmoos et al.

[11] Patent Number: 5,326,464

[45] Date of Patent: Jul. 5, 1994

[54] CRYSTALLINE COMPOSITION

[75] Inventors: Roland von Ballmoos, Hopewell; Cynthia T-W. Chu, Princeton Junction; Michael E. Landis, Woodbury, all of N.J.; Eric G. Derouane, Namur, Belgium

[73] Assignee: Mobil Oil Corp., Fairfax, Va.

[21] Appl. No.: 397,076

[22] Filed: Aug. 22, 1989

Related U.S. Application Data

[60] Division of Ser. No. 136,083, Dec. 21, 1987, Pat. No. 4,880,611, and a continuation-in-part of Ser. No. 117,858, Nov. 6, 1987, abandoned, which is a continuation of Ser. No. 878,754, Jun. 26, 1986, Pat. No. 4,891,197, which is a continuation-in-part of Ser. No. 642,925, Aug. 21, 1984, abandoned, which is a continuation-in-part of Ser. No. 562,673, Dec. 19, 1983, abandoned.

[51] Int. Cl.[5] .................... C07C 4/06; C10G 47/04
[52] U.S. Cl. ...................... 208/110; 208/119
[58] Field of Search ................ 208/110, 119

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 3,801,704 | 4/1974 | Kobayashi et al. | 423/309 |
| 4,310,440 | 1/1982 | Wilson et al. | 252/435 |
| 4,385,994 | 5/1983 | Wilson et al. | 210/689 |
| 4,440,871 | 4/1984 | Lok et al. | 502/214 |
| 4,473,663 | 9/1984 | Patton et al. | 502/208 |
| 4,486,397 | 12/1984 | Eahraghi et al. | 423/306 |
| 4,683,217 | 7/1987 | Lok et al. | 502/214 |
| 4,684,617 | 8/1987 | Lok et al. | 502/214 |
| 4,686,092 | 8/1987 | Lok et al. | 423/306 |
| 4,686,093 | 8/1987 | Flanigen et al. | 423/306 |
| 4,704,478 | 11/1987 | Olson | 568/388 |
| 4,880,611 | 11/1989 | von Ballmoos et al. | 423/306 |
| 4,891,197 | 1/1990 | Derouane et al. | 423/279 |

FOREIGN PATENT DOCUMENTS

| | | |
|---|---|---|
| 0158977 | 10/1958 | European Pat. Off. |
| 0043562 | 1/1982 | European Pat. Off. |
| 0121232 | 10/1984 | European Pat. Off. |
| 0121233 | 10/1984 | European Pat. Off. |
| 0158348 | 10/1985 | European Pat. Off. |
| 0158349 | 10/1985 | European Pat. Off. |
| 0158350 | 10/1985 | European Pat. Off. |
| 0158975 | 10/1985 | European Pat. Off. |
| 0158976 | 10/1985 | European Pat. Off. |
| 0161488 | 11/1985 | European Pat. Off. |
| 0161489 | 11/1985 | European Pat. Off. |
| 0161490 | 11/1985 | European Pat. Off. |
| 0161491 | 11/1985 | European Pat. Off. |

OTHER PUBLICATIONS

Hawley "The Condensed Chemical Dictionary", 9th Ed (1977) Litton Publishing Co. p. 746.

F. d'Yvoire, Memoir Presented to the Chemical Society, No. 392, "Study of Aluminum Phosphate and Trivalent Iron", Jul. 6, 1961, pp. 1762-1776.

C. Baerlocher and R. M. Barrer, "The Structure of the Synthetic Zeolite (K,Ba)-G,L", Zeitschrift fur Kristallographie, Bd. 136, S.245-254 (1972).

M. E. Davis et al. "A Molecular Sieve with Eighteen-Membered Rings" Nature, vol. 331 Feb. 25, 1988, pp. 698-699.

*Primary Examiner*—Asok Pal
*Attorney, Agent, or Firm*—Alexander J. McKillop; Dennis P. Santini; Laurence P. Hobbes

[57] ABSTRACT

A process for converting feedstock comprising hydrocarbon compounds to product comprising hydrocarbon compounds of lower molecular weight than said feedstock hydrocarbon compounds which comprises contacting said feedstock at conditions for said conversion with catalyst comprising crystals having a framework topology after heating at 110° C. or higher giving an X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6-13.3 Angstroms.

15 Claims, 5 Drawing Sheets

10

CRYSTALLINE COMPOSITION

CROSS-REFERENCE TO RELATED APPLICATIONS

This application is a divisional of U.S. application Ser. No. 07/136,083, filed Dec. 21, 1987, now U.S. Pat. No. 4,880,611, which is a continuation-in-part of copending U.S. application Ser. No. 07/117,858, filed Nov. 6, 1987, now abandoned, which is a continuation of U.S. application Ser. No. 06/878,754, filed Jun. 26, 1986, now U.S. Pat. No. 4,891,197, which is a continuation-in-part of copending U.S. application Ser. No. 06/642,925, filed Aug. 21, 1984, now abandoned, which is, in turn, a continuation-in-part of copending U.S. application Ser. No. 06/562,673, filed Dec. 19, 1983, now abandoned.

Application Ser. Nos. 642,968 and 642,969, both filed Aug. 21, 1984, now abandoned, are also continuation-in-part of application Ser. No. 562,673, filed Dec. 19, 1983, now abandoned. Application Ser. No. 122,974, filed Nov. 19, 1987, now abandoned, is also a continuation of application Ser. No. 878,754, filed Jun. 26, 1986, now U.S. Pat. No. 4,891,197. Application Ser. No. 685,171, filed Dec. 21, 1984, now U.S. Pat. No. 4,673,559, is also a continuation-in-part of U.S. application Ser. No. 562,673, filed Dec. 19, 1983, now abandoned. Application Ser. No. 642,925, filed Aug. 21, 1984, now abandoned, is a continuation-in-part of U.S. application Ser. No. 615,391, filed May 25, 1984, now abandoned. Application Ser. No. 804,326, filed Dec. 4, 1985, now abandoned is a continuation of application Ser. No. 615,391, filed May 25, 1984, now abandoned. Application Ser. No. 878,754, filed Jun. 26, 1986, now U.S. Pat. No. 4,891,197 is also a continuation-in-part of U.S. application Ser. No. 685,186, filed Dec. 21, 1984, now U.S. Pat. No. 4,623,527, which is, in turn, a continuation-in-part of application Ser. No. 562,909, filed Dec. 19, 1983, now abandoned.

This Application is also related to European Patent Application Number 84308812.1, filed Dec. 17, 1984, now Published European Patent Application Number 147,991 and European Patent Application Number 84308805.5, filed Dec. 17, 1884, now Published European Patent Application Number 146,384.

The entire disclosures of the above-mentioned U.S. and European Patent Applications are expressly incorporated herein by reference.

BACKGROUND OF THE INVENTION

1. Field of The Invention

This invention relates to a novel synthetic crystalline molecular sieve composition which may contain framework +3 valence element, e.g. aluminum, +4 valence element, e.g. silicon, and +5 valence element, e.g. phosphorous, and to use thereof in catalytic conversion of organic compounds. The crystalline composition of this invention exhibits ion-exchange properties and can easily be converted to catalytically active material.

2. Description of Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as $Ca/2$, $Sr/2$, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. Aluminum phosphate materials have essentially electroneutral lattices and, therefore, are not useful as ion-exchangers or as catalyst components. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous, is the "$H_1$" phase or hydrate of aluminum phosphate of F. d'Yvoire, *Memoir Presented to the Chemical Society*, No. 392, "Study of Aluminum Phosphate and Trivalent Iron" Jul. 6, 1961 (received), pp. 1762–1776. This material, when crystalline, is identified by the Joint Commission for Powder Diffraction Standards (JCPDS), card number 15-274, and has an X-ray diffraction pattern exhibiting lines of Tables 1A, 1B, and 1C, hereinafter presented. Once heated at about 110° C., however, the d'Yvoire material becomes amorphous.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,296 (i.e. ZK-21) and 3,791,964 (i.e. ZK-22).

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other references teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is essentially void of ion-exchange properties, they are used as catalyst supports or matrices. The crystalline composition of this invention is a molecular sieve composition exhibiting ion-exchange properties and is easily and conveniently converted to material having intrinsic catalytic activity.

SUMMARY OF THE INVENTION

The present invention is directed to a novel synthetic crystalline molecular sieve composition comprising, after heating to at least 110° C., a crystal having a framework topology giving a certain X-ray diffraction pattern which may contain one or more +3 valence elements, +4 valence elements and +5 valence elements, and to its use as a catalyst component in catalytic conversion of organic, e.g. hydrocarbon, compounds. The present composition will have a balance of structural components, such as, for example, sufficient +4 valance element, to give it an ion-exchange capacity of at least about 0.002 meg/g.

The anhydrous crystalline composition of this invention has the general chemical formula:

$$M_{x/m}{}^{m+}: (XO_2)_{1-y}{}^-: (YO_2)_{1-x}:(ZO_2)_{x+y}:N_{y/n}{}^{n-}$$

wherein X is the +3 valence element, Y is the +5 valence element, Z is the +4 valence element, M is a cation of valence m, N is an anion of valence n, and x and y are numbers of from greater than −1 to less than +1 which satisfy the relationships:

(1) if x is 0, then y is not 0,
(2) if y is 0, then x is not 0, and
(3) x+y is greater than 0.001 and less than 1.

In the composition above, when x is greater than y, the present composition is a cation exchanger with potential use as an acidic catalyst. When x is less than y, it is an anion exchanger with potential use as a basic catalyst.

In the synthesized form of the present composition, it can also contain occluded organic material, D′, and water molecules, entrapped during the synthesis and filling the microporous voids. It then has the general formula:

$$vD':M_{x/m}{}^{m+}:(XO_2)_{1-y}{}^-:(YO_2)_{1-x}{}^+:(ZO_2)_{x+y}\cdot N_{y/n}{}^{n-}:w(H_2O)$$

wherein v is the number of moles of D′, occludea organic material resulting from organic directing agent (D) and/or solvent used in synthesis of and filling microporous voids of the composition, which material may be removed upon calcination, w is moles of $H_2O$, e.g. from 0 to about 5, and x and y are the numbers defined above.

The present invention is a unique composition of matter which exhibits a valuable combination of catalytic, sorption and ion-exchange properties.

EMBODIMENTS

Figure 1:
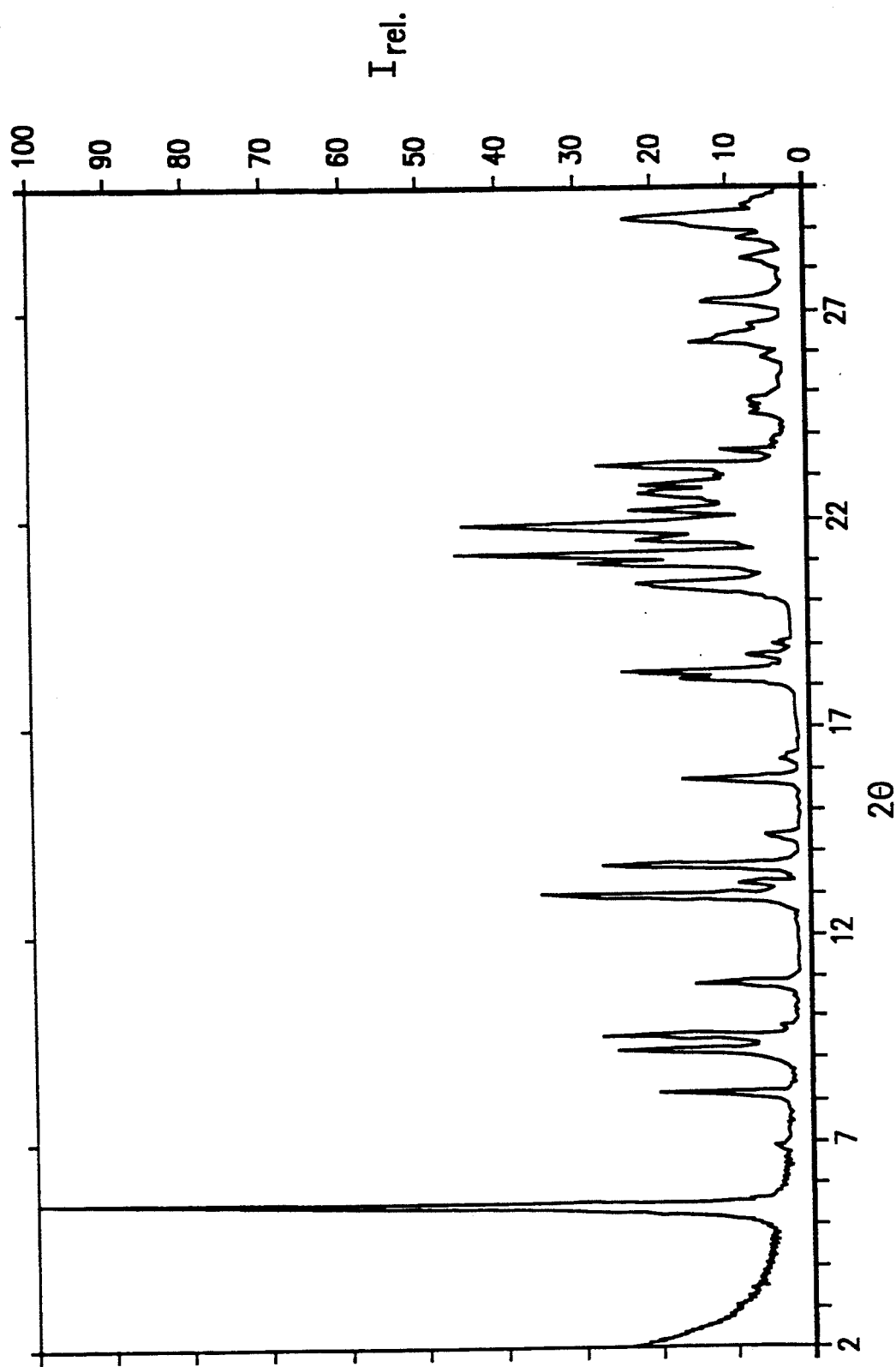
FIG. 1 shows the X-ray diffraction pattern of the Example 1 product.

The composition of the present invention may comprise one or more +3 valence elements, such as those selected from the group consisting of aluminum, iron, chromium, vanadium, molybdenum, arsenic, antimony, manganese, gallium and boron; one or more +4 valence elements, such as those selected from the group consisting of silicon, germanium and titanium; and one or more +5 valence elements, such as those selected from the group consisting of phosphorous, arsenic, antimony and vanadium, in the structure thereof.

The composition of the present invention will exhibit unique and useful catalytic, sorptive and shape selective properties along with a +4 valence element/ (+3 valence element plus +5 valence element), e.g. silicon/-(aluminum+phosphorus), atomic ratio of less than unity, but greater than zero, e.g. from about 0.001 to 0.99. It is well recognized that aluminum phosphates exhibit a phosphorus/aluminum atomic ratio of only 0.8 to 1.2 and contain essentially no structural silicon. Also, the phosphorus-substituted zeolite compositions, sometimes referred to as "aluminosilicophosphate zeolites", have a silicon/aluminum atomic ratio of from 0.66 to 8.0, and a phosphorus/aluminum atomic ratio of from greater than 0 to 1.0.

The original cations of the as-synthesized present composition can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the composition catalytically active or control catalytic activity, especially for hydrocarbon conversion. These include hydrogen, rare earth metal and metals of Groups IA, IIA, IIIA, IVA, IB, IIB, IIIB, IVB, VIB and VIII of the Periodic Table of the Elements.

Typical ion exchange technique would be to contact the synthetic present composition with a salt of the desired replacing cation or cations. Examples of such salts include the halides, e.g. chlorides, nitrates and sulfates.

Framework topologies of the present composition containing +4 valence element, e.g. silicon, +5 valence element, e.g. phosphorus, +3 valence element, e.g. aluminum, in tetrahedrally coordinated structural positions are not those of layered materials, but are rigid 3-dimensional crystals.

The crystalline composition of the present invention can be beneficially thermally treated, either before or after ion exchange. This thermal treatment is performed by heating the composition in an atmosphere such as air, nitrogen, hydrogen, steam, etc., at a temperature of from about 300° C. to about 1100° C., preferably from about 350° C. to about 750° C., for from about 1 minute to about 20 hours. While subatmospheric or superatmospheric pressures may be used for this thermal treatment, atmospheric pressure is desired for reasons of convenience.

The present composition exhibits, even after being heated at 110° C. or higher, an X-ray diffraction pattern which distinguishes it from other prior crystalline compositions. The X-ray diffraction pattern of this composition may have the following characteristic values:

TABLE 1A

| Interplanar d-Spacings (A) | Relative Intensity |
|---|---|
| 16.4 ± 0.2 | vs |
| 8.2 ± 0.1 | w |
| 4.74 ± 0.05 | w | and more specifically the following characteristic values:

TABLE 1B

| Interplanar d-Spacings (A) | Relative Intensity |
|---|---|
| 16.4 ± 0.2 | vs |
| 8.2 ± 0.1 | w |
| { 6.21 / 6.17 } ± 0.05 | w |
| 5.48 ± 0.05 | w |
| 4.74 ± 0.05 | w | and even more specifically the following characteristic values:

TABLE 1C

| Interplanar d-Spacings (A) | Relative Intensity |
|---|---|
| 16.4 ± 0.2 | vs |
| 8.2 ± 0.1 | w |
| { 6.21 / 6.17 } ± 0.05 | w |
| 5.48 ± 0.05 | w |
| 4.74 ± 0.05 | w |
| 4.10 ± 0.04 | w |
| 4.05 ± 0.04 | w |
| { 3.96 / 3.94 } ± 0.04 | w |
| 3.76 ± 0.03 | w |
| 3.28 ± 0.03 | w |

The X-ray diffraction lines in Tables 1A, 1B and 1C identify a crystal framework topology in the composition exhibiting large pore windows of 18-membered ring size. The pores are at least about 12 Angstroms, e.g. 12-13 Angstroms in diameter. These lines distinguish this topology from other crystalline aluminosilicate, aluminophosphate and silicoaluminophosphate structures. It is noted that the X-ray pattern of the present composition is void of a d-spacing value at 13.6-13.3 Angstroms with any significant intensity relative the strongest d-spacing value. If a d-spacing value in this range appears in a sample of the present composition, it is due to impurity and will have a weak relative intensity. An 18-membered ring structure was published by M. Davis, D. Saldarriaga, C. Montes and J. Garces at the "Innovation in Zeolite Materials Science" meeting in Nieuwpoort, Belgium, Sep. 13-17, 1987. The large pore "AlPO$_4$-8" of U.S. Pat. No. 4,310,440 has a d-spacing value at 13.6-13.3 Angstroms with a medium-very strong relative intensity as reported in the patent. The d'Yvoire aluminum phosphate identified above, i.e. JCPDS card number 15-274, is not crystalline after being heated at about 110° C.

These X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (A), and the relative intensities of the lines, I/I$_o$, where I$_o$ is one-hundredth of the intensity of the strongest line, including substraction of the background, were derived. The relative intensities are given in terms of the symbols vs=very strong (75-100%), s=strong (50-74%), m=medium (25-49%) and w=weak (0-24%). It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the +4 valence element/+3 valence element, e.g. silicon/aluminum, and the +5 valence element/+3 valence element, e.g. phosphorus/aluminum, ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

The crystalline composition of this invention may be converted to the dry, hydrogen form by the above thermal treatment of the organic cation-containing form or hydrogen ion precursor-containing form resulting from ion exchange.

In general, the composition of the present invention can be prepared by any suitable means, such as, for example, from a two-phase reaction mixture by:

1) providing a reaction mixture comprising sources of X oxide, Y oxide and Z oxide, wherein X represents one or more elements of +3 valence selected from the group consisting of, for example, aluminum, iron, chromium, vanadium, molybdenum, arsenic, antimony, manganese, gallium and boron; Y represents one or more elements of +5 valence selected from the group consisting of, for example, phosphorous, arsenic, antimony and vanadium; Z represents one or more elements of +4 valence selected from the group consisting of, for example, silicon, germanium and titanium, one of said oxide sources being unstable in water, an organic directing agent D, inorganic cations M and anions N, and a substantially water-immiscible organic solvent for said oxide source unstable in the water, the components of said reaction mixture having the following relationship:

$$(D)_a:(M_2O)_b:(X_2O_3)_c:(ZO_2)_d:(Y_2O_5)_e:(Solvent)_f:(N)_g:(H_2O)_h$$

where a, b, c, d, e, f, g, and h are numbers satisfying the following relationships:
a/(c+d+e) is less than 4,
b/(c+d+e) is less than 2,
d/(c+e) is less than 2,
f/(c+d+e) is from 0.1 to 15,
g/(c+d+e) is less than 2, and
h/(c+d+e) is from 3 to 150,
wherein upon initial provision of said reaction mixture said oxide source unstable in the water is dispersed or dissolved in the water-immiscible organic solvent;
2) heating said reaction mixture at a rate of from 5° C. to 200° C. per hour to a temperature of from 80° C. to 300°;
3) agitating said reaction mixture in a manner sufficient to intimately admix the water-immiscible organic solvent and the water with each other, thereby progressively hydrolyzing the oxide source unstable in water;
4) maintaining said agitated reaction mixture at a temperature of from 80° C. to 300° C. and a pH of from 2 to 9 until crystals of oxide material are formed; and
5) recovering from said reaction mixture a composition characterized, in the anhydrous state, as follows:

$$D'_v:M_{x/m}^{m+}:(XO_2)_{1-y^-}:(YO_2)_{1-x^+}:(ZO_2)_{x+y^-}N_{y/n}^{n-}$$

wherein D' represents the total of organic directing agent D plus organic solvent, v is the number of moles of D', m is the valence of cation M, n is the valence of anion N, and x and y are numbers of from greater than −1 to less than +1 which satisfy the relationships:
(1) if x is 0, then y is not 0,
(2) if y is 0, then x is not 0, and
(3) x+y is greater than 0.001 and less than 1,
said composition having an ion exchange capacity of at least about 0.002 meg/g.

Reaction conditions may comprise carefully heating the above reaction mixture at a rate of from 5° C. to 200° C. per hour to a temperature of from about 80° C. to about 300° C. for a period of time of from about 5 hours to about 500 hours until crystals of the present composition are formed. A more preferred temperature range is from about 100° C. to about 200° C. with the amount of time at a temperature in such range being from about 15 hours to about 168 hours. During heating and maintaining the reaction mixture at the desired temperature, the pH must be carefully controlled to be from about 2 to about 12. Control of pH can be accomplished by adjusting the concentration of the added organic and/or inorganic base(s).

The reaction is carried out until crystals of the desired composition form. The crystalline product is recovered by separating same from the reaction medium, as by cooling the whole to room temperature, filtering and washing with water before drying.

The above reaction mixture composition can be prepared utilizing materials which supply the appropriate components. The aqueous phase components may include from the sources of the +3, +4 or +5 valence elements, e.g. silicon, phosphorus, or aluminum, those not included in the water-immiscible, e.g. organic, phase. The organic phase comprises an organic solvent and a source of at least one of the +3, +4 or +5 valence elements, e.g. silicon, phosphorus, or aluminum, insoluble in the aqueous phase under reaction conditions. The aqueous phase also contains the required directing agent.

Useful sources of +3 valence element, e.g. aluminum, as non-limiting examples, include any known form of oxide or hydroxide, organic or inorganic salt or compound. Useful sources of +4 valence element, e.g. silicon, include, as non-limiting examples, any known form of dioxide or silicic acid, alkoxy- or other compounds of such element. Useful sources of +5 valence element, e.g. phosphorus, include, as non-limiting examples, any known form of phosphorus acids or phosphorus oxides, phosphates and phosphites, and organic derivatives of such element.

The organic solvent is a $C_5$–$C_{10}$ alcohol or any other liquid compound substantially immiscible with water, as non-limiting examples.

An organic directing agent can be selected from the group consisting of organic mono- or dialkylamines, alkyl being of 3 or 4 carbon atoms, and onium compounds having the following formula:

$$R_4M^+X^- \text{ or } (R_3M^+R'M^+R_3)X_2$$

wherein R or R' is alkyl of from 1 to 20 carbon atoms, or combinations thereof; M is a tetracoordinate element (e.g. nitrogen, phosphorus, arsenic, antimony or bismuth); and X is an anion (e.g. fluoride, chloride, bromide, iodide, hydroxide, acetate, sulfate, carboxylate, etc.).

Particularly preferred directing agents for synthesis of the present composition include onium compounds, above defined, wherein R is alkyl of 1 to 4 carbon atoms, M is nitrogen and X is halide or hydroxide. Non-limiting examples of these include tetrapropylammonium hydroxide, tetraethylammonium hydroxide and tetrapropylammonium bromide; and dialkylamines wherein alkyl is propyl or butyl.

The composition prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

It may be desired to incorporate the new composition with another material, i.e. a matrix, resistant to the temperatures and other conditions employed in various organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Catalyst compositions containing the present composition will generally comprise from about 1% to 90% by weight of the present composition and from about 10% to 99% by weight of the matrix material. More preferably, such catalyst compositions will comprise from about 2% to 80% by weight of the present composition and from about 20% to 98% by weight of the matrix.

Use of a material in conjunction with the new composition, i.e. combined therewith, which is active, tends to alter the conversion and/or selectivity of the overall catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the crush strength of the overall catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the present composition can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

Employing a catalytically active form of the present composition as a catalyst component, said catalyst possibly containing additional hydrogenation components, reforming stocks can be reformed employing a temperature of from about 370° C. to about 540° C., a pressure of from about 100 psig to about 1000 psig (791 to 6996 kPa), preferably from about 200 psig to about 700 psig (1480 to 4928 kPa), a liquid hourly space velocity is from about about 0.1 to about 10, preferably from about 0.5 to about 4, and a hydrogen to hydrocarbon mole ratio of from about 1 to about 20, preferably from about 4 to about 12.

A catalyst comprising the present composition can also be used for hydroisomerization of normal paraffins, when provided with a hydrogenation component, e.g. platinum. Such hydroisomerization is carried out at a temperature of from about 90° C. to about 375° C., preferably from about 145° C. to about 290° C., with a liquid hourly space velocity of from about 0.01 to about 2, preferably from about 0.25 to about 0.50, and with a hydrogen to hydrocarbon mole ratio of from about 1:1 to about 5:1. Additionally, such a catalyst can be used for olefin or aromatic isomerization, employing a temperature of from about 200° C. to about 480° C.

Such a catalyst can also be used for reducing the pour point of gas oils. This reaction is carried out at a liquid hourly space velocity of from about 10 to about 30 and at a temperature of from about 425° C. to about 595° C.

Other reactions which can be accomplished employing a catalyst comprising the composition of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

In order to more fully illustrate the nature of the invention and the manner of practicing same, the following examples are presented. Be aware that these examples and other definition of the present composition appear by incorporation by reference of application Ser. No. 562,775 in parent application Ser. No. 878,754 to exemplify compositions made by the method therein claimed. They also appear in application Ser. No. 685,171, a continuation-in-part of application Ser. No. 562,673, a grandparent of application Ser. No. 878,754, and great-grandparent of the present application.

In the examples, whenever adsorption data are set forth for comparison of sorptive capacities for various adsorbants, they were determined as follows:

A weighed sample of the calcined adsorbant was contacted with a flowing stream of the equilibrium vapor of the adsorbate at 25° C., admixed with dry nitrogen. Adsorbates were water vapor and n-hexane, 2-methylpentane, xylene or cyclohexane vapors. The sample temperature was maintained at 90° C. for adsorbates other than ortho-xylene for which it was 120° C. and water for which it was 60° C. The increase in weight was measured gravimetrically and converted to the adsorption capacity of the sample in weight percent of calcined adsorbant.

When Alpha Value is examined, it is noted that the Alpha Value is an approximate indication of the catalytic cracking activity of the catalyst compared to a standard catalyst and it gives the relative rate constant (rate or normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in *The Journal of Catalysis*, 6, pp. 522–529 (August 1965), and in *The Journal of Catalysis*, 61, p. 395 (1980), each incorporated herein by reference as to that description.

When ion-exchange capacity is examined, it is determined by titrating with a solution of sulfamic acid the gaseous ammonia evolved during the temperature programmed decomposition of the ammonium-form of the present composition. The method is described in *Thermochimica Acta*, Vol. III, pp. 113–124, 1971 by G. T. Kerr and A. W. Chester, incorporated herein by reference as to that description.

EXAMPLE 1

A two-phase synthesis reaction mixture was prepared with the organic phase comprised of 10 g $Si(OC_2H_5)_4$ and 60 g 1-hexanol, and the aqueous phase comprised of 23.1 g $H_3PO_4$ (85%), 13.7 g $Al_2O_3$, 10.1 g di-n-propylamine and 59.6 g of $H_2O$. The reaction mixture as a whole had a composition including 9.3% Si, 38.8% P and 51.9% Al, the percentages atomic. The directing agent was di-n-propylamine. Starting pH was between 5 and 7.

The reaction mixture was heated at 50° C. per hour to 130° C. and maintained at that temperature for 24 hours. It was then heated to 200° C. and maintained at that temperature for 24 hours until crystals of product formed.

The crystalline product was separated from the reaction mixture by filtration, water washed and then dried at 80° C. The product composition was analyzed to contain 13.1% Si, 42.7% P and 44.2% Al, percentages atomic. A sample of the product composition was then submitted for X-ray analysis and found to be a molecular sieve composition exhibiting the diffraction lines shown in Table 2. The X-ray diffraction pattern is shown in FIG. 1. There was no d-spacing value in the range of 13.6–13.3 Angstroms with a significant intensity relative that of the strongest d-spacing value. Further, the interplanar d-spacings at 16.4±0.2 Angstroms, 8.2±0.1 Angstroms and 4.74±0.05 Angstroms did not disappear upon calcination.

TABLE 2

| Interplanar d-Spacing (A) | Observed 2 × Theta | Relative Intensities $I/I_o$ |
|---|---|---|
| *16.431 | 5.37 | 100 |
| 12.893 | 6.85 | 2 |
| 10.881 | 8.12 | 19 |
| 9.682 | 9.13 | 24 |
| 9.327 | 9.48 | 27 |
| 9.086 | 9.73 | 2 |
| *8.211 | 10.77 | 14 |
| 6.866 | 12.89 | 36 |
| 6.701 | 13.21 | 8 |
| 6.496 | 13.63 | 28 |
| ***6.165 | 14.36 | 5 |
| 5.640 | 15.71 | 16 |
| *5.460 | 16.23 | 2 |
| 4.842 | 18.32 | 23 |
| *4.743 | 18.70 | 6 |
| 4.665 | 19.02 | 2 |
| 4.348 | 20.42 | 20 |
| 4.250 | 20.89 | 24 |
| 4.212 | 21.09 | 40 |
| ***4.136 | 21.48 | 15 |
| **4.083 | 21.76 | 42 |
| 4.007 | 22.18 | 16 |
| **3.939 | 22.57 | 15 |
| 3.903 | 22.78 | 15 |
| 3.830 | 23.22 | 23 |
| *3.769 | 23.60 | 6 |
| 3.614 | 24.63 | 4 |
| 3.591 | 24.78 | 5 |
| 3.445 | 25.85 | 3 |
| 3.393 | 26.25 | 13 |
| 3.351 | 26.59 | 5 |
| **3.278 | 27.19 | 11 |
| 3.162 | 28.21 | 5 |
| 3.108 | 28.71 | 5 |
| 3.064 | 29.13 | 23 |
| 3.028 | 29.48 | 5 |

*diffraction lines identifying a crystal framework topology having pore windows formed by 18 tetrahedral members.
**diffraction lines of * plus additional intensity contribution from other crystalline phase.
***doublet.

EXAMPLE 2

Figure 2:
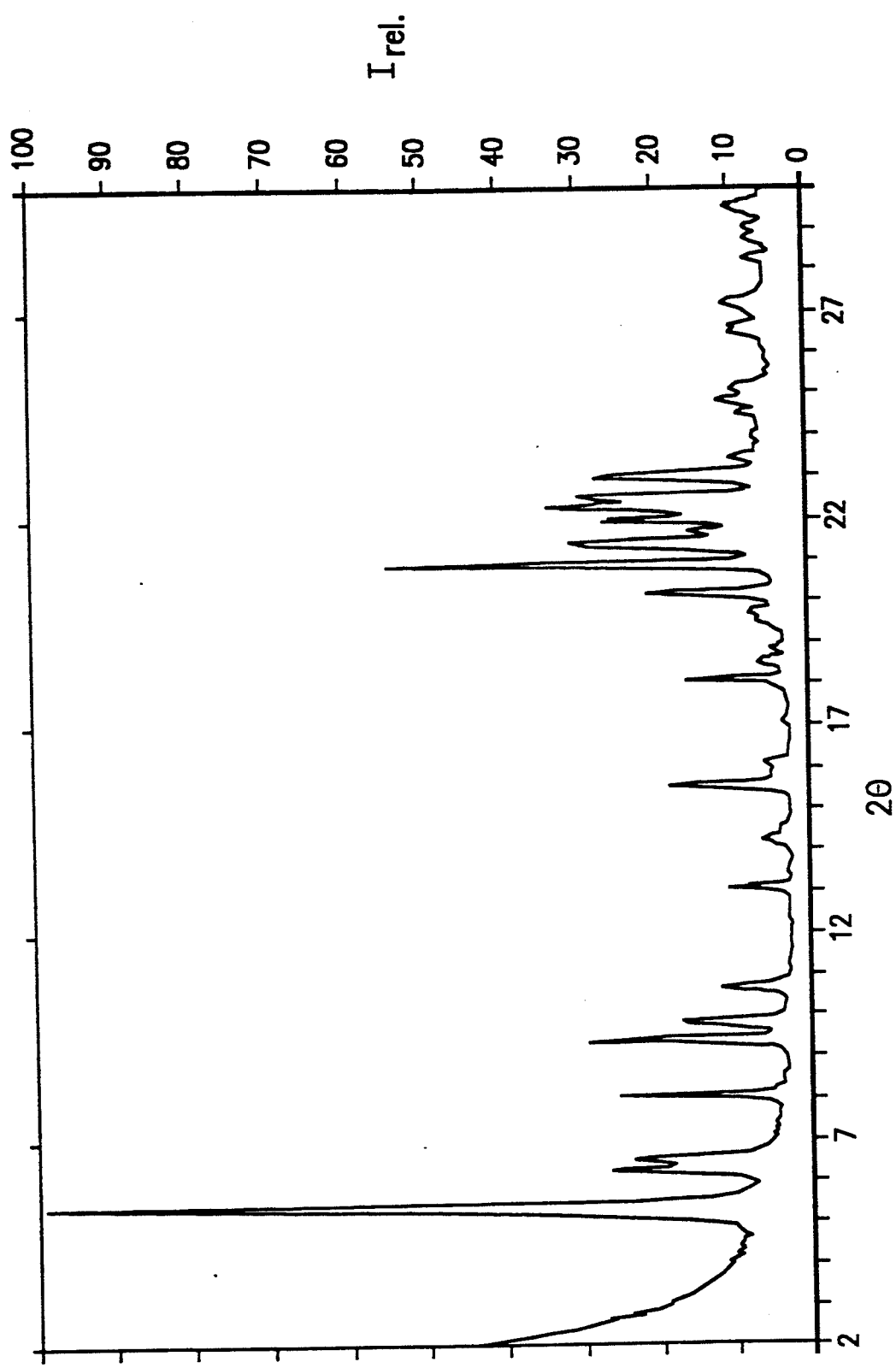
FIG. 2 shows the X-ray diffraction pattern of the Example 2 product.

The synthesis of Example 1 was repeated except that the reaction mixture was kept at 200° C. for 48 hours. The crystalline product composition was analyzed to contain 14.5% Si, 42.4% P and 43.1% Al, percentages atomic. A sample of the product composition was submitted for X-ray analysis and found to exhibit the diffraction lines shown in Table 3. The X-ray diffraction pattern is shown in FIG. 2. There again was no d-spacing value in the range of 13.6–13.3 Angstroms with a significant intensity relative that of the strongest d-spacing value.

TABLE 3

| Interplanar d-Spacing (A) | Observed 2 × Theta | Relative Intensities $I/I_o$ |
|---|---|---|
| *16.512 | 5.35 | 100 |
| 14.086 | 6.27 | 21 |
| 13.582 | 6.50 | 19 |
| 10.908 | 8.10 | 23 |
| 9.336 | 9.47 | 28 |
| 8.927 | 9.90 | 17 |
| *8.228 | 10.75 | 10 |
| 6.714 | 13.18 | 10 |
| ***6.174 | 14.34 | 4 |
| 6.078 | 14.57 | 2 |
| 5.643 | 15.70 | 19 |
| *5.158 | 16.06 | 3 |
| 5.462 | 16.22 | 4 |
| 4.847 | 18.30 | 15 |
| 4.747 | 18.68 | 4 |
| 4.661 | 19.03 | 2 |
| 4.497 | 19.74 | 4 |
| 4.452 | 19.93 | 4 |
| 4.351 | 20.40 | 19 |
| 4.207 | 21.11 | 60 |
| **4.110 | 21.61 | 28 |
| **4.056 | 21.90 | 10 |
| 4.009 | 22.16 | 23 |
| **3.947 | 22.52 | 30 |
| 3.907 | 22.75 | 25 |
| 3.830 | 23.22 | 24 |
| *3.771 | 23.59 | 3 |
| *3.636 | 24.48 | 4 |
| 3.593 | 24.77 | 7 |
| 3.557 | 25.03 | 5 |
| 3.369 | 26.45 | 6 |
| 3.358 | 26.54 | 6 |
| **3.283 | 27.15 | 7 |
| 3.162 | 28.21 | 3 |
| 3.108 | 28.71 | 3 |
| 3.080 | 28.98 | 4 |
| 3.028 | 29.49 | 7 |
| 2.994 | 29.84 | 2 |

*diffraction lines identifying a crystal framework topology having pore windows formed by 18 tetrahedral members.
**diffraction lines of * plus additional intensity contribution from other crystalline phase.
***doublet.

EXAMPLE 3

Figure 3:
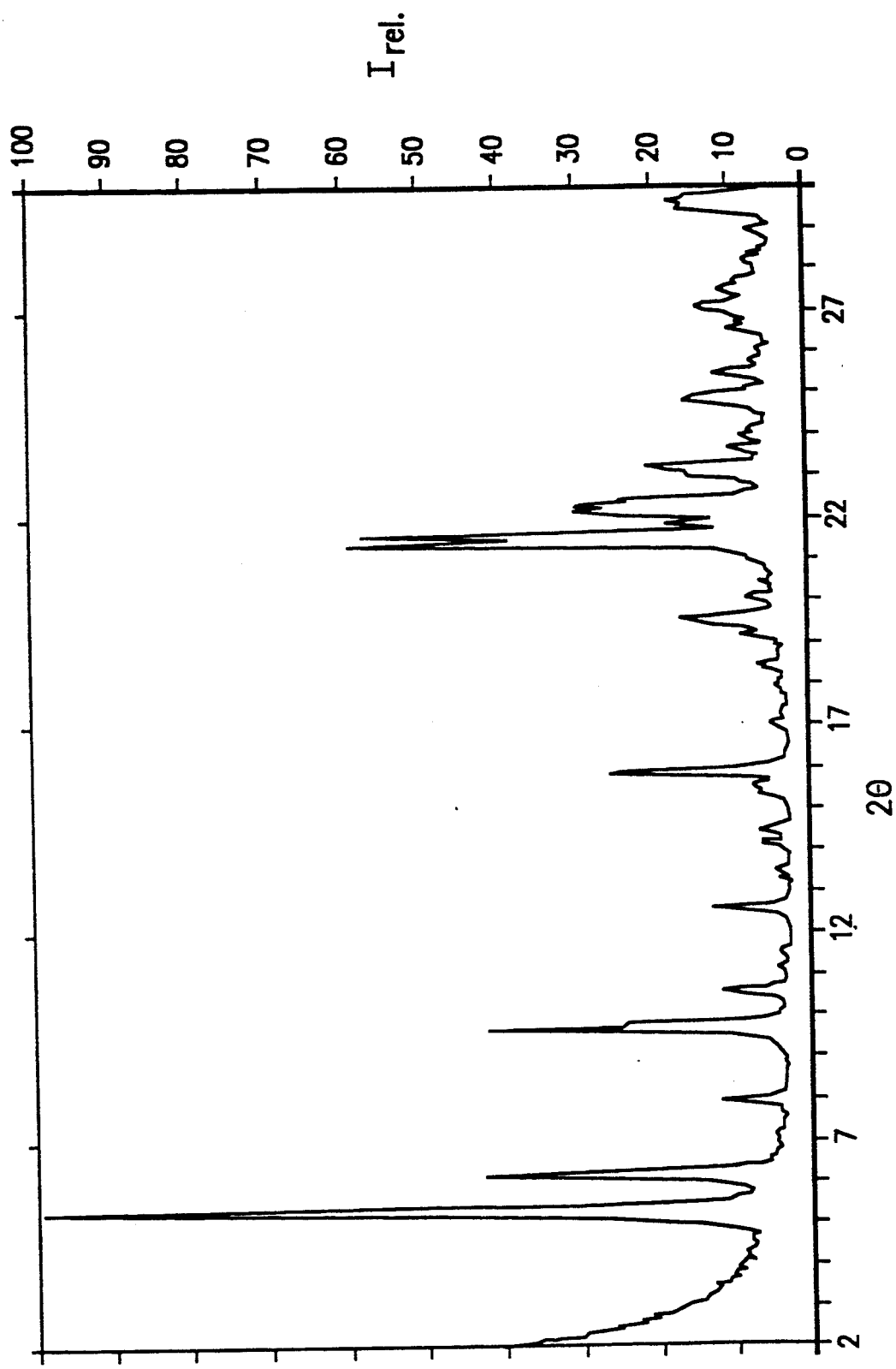
FIG. 3 shows the X-ray diffraction pattern of the Example 3 product.

A quantity of the product composition of Example 2 was calcined at 450° C. in nitrogen for 4 hours and then X-ray analyzed. The results are presented in Table 4. The X-ray diffraction pattern is shown in FIG. 3. Again, there was no d-spacing value in the range of 13.6–13.3 Angstroms with a significant intensity relative that of the strongest d-spacing value.

TABLE 4

| Interplanar d-Spacing (A) | Observed 2 × Theta | Relative Intensities $I/I_o$ |
|---|---|---|
| *16.495 | 5.35 | 100 |
| 14.163 | 6.24 | 40 |
| 10.995 | 8.04 | 8 |
| 9.006 | 9.82 | 40 |
| *8.227 | 10.75 | 7 |
| 6.929 | 12.77 | 11 |
| 6.472 | 13.68 | 2 |
| ***6.171 | 14.35 | 4 |
| 6.038 | 14.67 | 4 |
| 5.665 | 15.64 | 5 |
| 5.622 | 15.76 | 5 |
| **5.513 | 16.07 | 26 |
| 5.143 | 17.23 | 2 |
| *4.743 | 18.70 | 3 |
| 4.559 | 19.46 | 5 |

TABLE 4-continued

| Interplanar d-Spacing (A) | Observed 2 × Theta | Relative Intensities I/I$_o$ |
|---|---|---|
| 4.473 | 19.84 | 14 |
| 4.358 | 20.37 | 4 |
| **4.099 | 21.67 | 62 |
| **4.066 | 21.85 | 59 |
| 4.015 | 22.13 | 13 |
| **3.960 | 22.45 | 26 |
| **3.941 | 22.55 | 27 |
| **3.783 | 23.51 | 16 |
| 3.706 | 24.00 | 4 |
| *3.661 | 24.30 | 2 |
| 3.549 | 25.08 | 11 |
| 3.463 | 25.72 | 7 |
| 3.334 | 26.73 | 5 |
| **3.276 | 27.21 | 10 |
| 3.224 | 27.66 | 6 |
| 3.200 | 27.87 | 4 |
| 3.159 | 28.24 | 3 |
| 3.139 | 28.42 | 2 |
| 3.081 | 28.97 | 2 |
| 3.026 | 29.51 | 15 |
| 3.011 | 29.66 | 15 |

*diffraction lines identifying a crystal framework topology having pore windows formed by 18 tetrahedral members.
**diffraction lines of * plus additional intensity contribution from other crystalline phase.
***doublet.

Note that the X-ray lines of Tables 1A, 1B and 1C did not disappear upon calcination.

EXAMPLE 4

A quantity of the product composition of Example 1 was calcined as described in Example 3 and ammonium-exchanged using a 1M NH$_4$NO$_3$ solution. The ion-exchange capacity measured from the evolution of ammonia was determined to be 0.22 meq/g.

EXAMPLE 5

The ion-exchange capacity of the product composition of Example 2 was determined as described in Example 4. It was equal to 0.105 meq/g.

EXAMPLE 6

A quantity of the product composition of Example 5 was tested in the Alpha Test. Its Alpha value was 1.4.

EXAMPLE 7

A quantity of the product composition of Example 5 was used to conduct the constraint index test (described in U.S. Pat. No. 4,385,195, entirely incorporated herein by reference). The constraint index was 0.4, indicating the presence of large pores.

EXAMPLE 8

A two-phase synthesis reaction mixture was prepared with the organic phase comprised of 10 g Si (OC$_2$H$_5$)$_4$ and 60 g 1-hexanol, and the aqueous phase comprised of 23 g H$_3$PO$_4$ (85%), 14 g Al$_2$O$_3$, 10 g di-n-propylamine and 60 g of H$_2$O. The reaction mixture as a whole had a composition approximately 10% Si, 41% P and 49% Al, the percentages atomic. The directing agent was di-n-propylamine. Starting pH was 5.5.

The reaction mixture, having been stirred without heating for 15 minutes, was heated at 50° C. per hour to 150° C. and maintained at that temperature for 24 hours while being stirred at 800 rpm until crystals of silicophosphoaluminate formed. Ending pH was 7.

Figure 4:
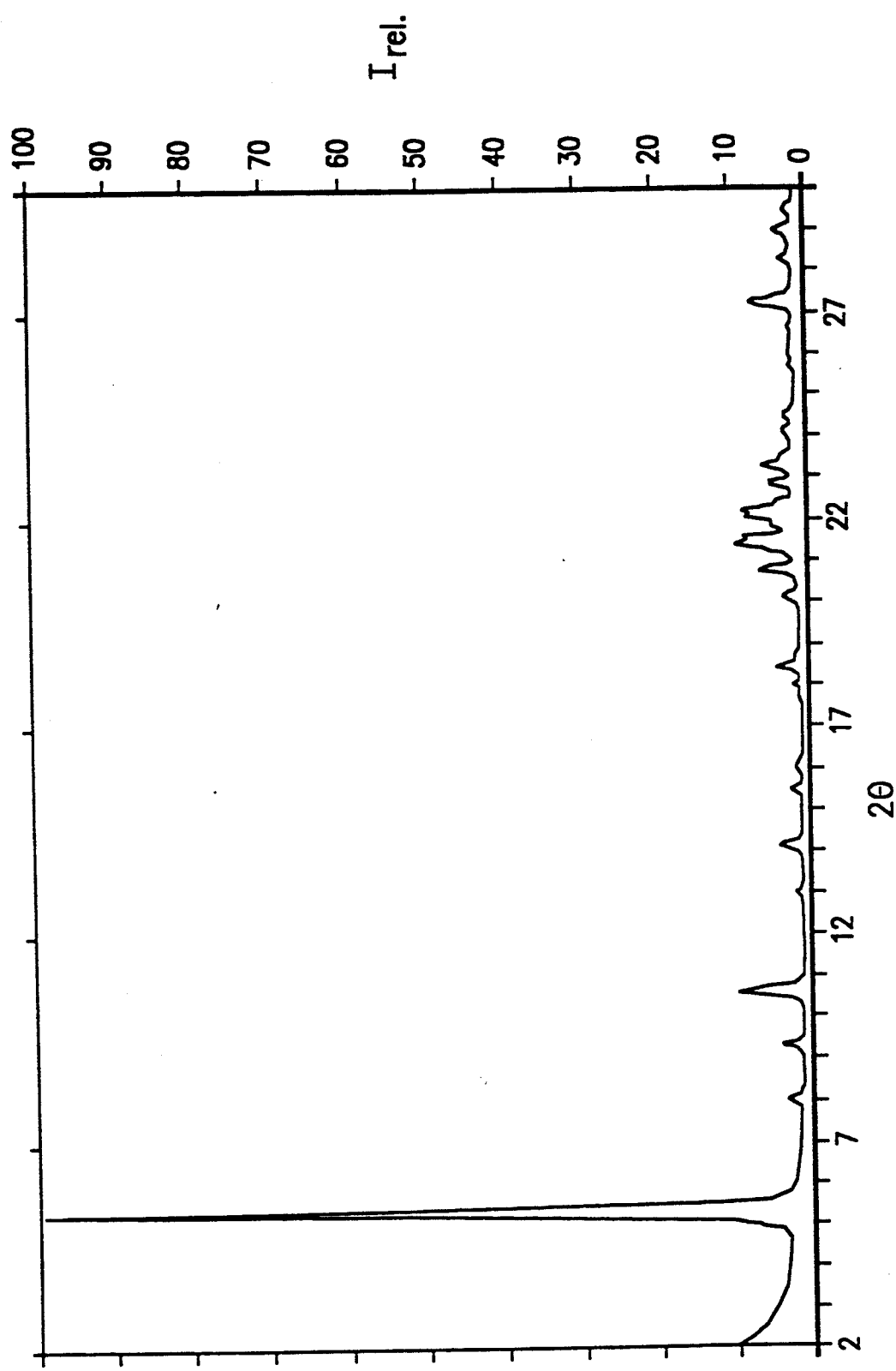
FIG. 4 shows the X-ray diffraction pattern of the Example 8 product.
Figure 5:
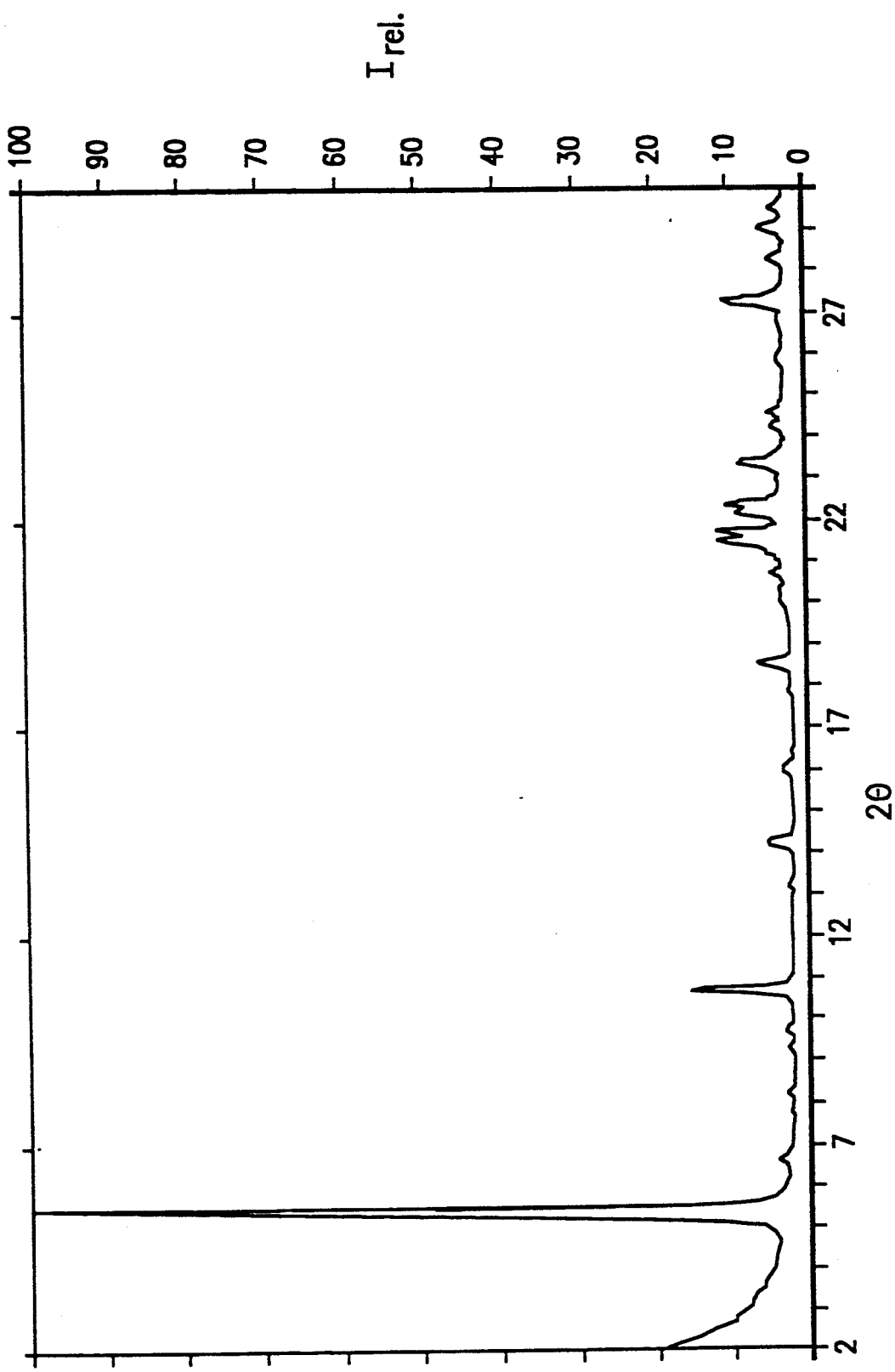
FIG. 5 shows the X-ray diffraction pattern of the calcined Example 8 product.

The crystalline product was separated from the reaction mixture by filtration, washed with toluene and ether and then dried. A sample of the product was then submitted for X-ray analysis and found to be a molecular sieve composition exhibiting the diffraction lines shown in Table 5A. The X-ray diffraction pattern of this sample is shown in FIG. 4. This product, after calcination at 450° C. in nitrogen and air for four hours each, was found to have the X-ray pattern shown in Table 5B and FIG. 5.

TABLE 5A

| Interplanar d-Spacing (A) | Observed 2 × Theta | Relative Intensities I/I$_o$ |
|---|---|---|
| *16.313 | 5.42 | 100 |
| 10.847 | 8.15 | 2 |
| 9.315 | 9.49 | 3 |
| *8.181 | 10.81 | 10 |
| 6.683 | 13.24 | 1 |
| ***6.162 | 14.37 | 4 |
| 5.637 | 15.71 | 2 |
| *5.455 | 16.24 | 1 |
| *4.933 | 17.98 | 1 |
| 4.842 | 18.32 | 2 |
| *4.731 | 18.75 | 3 |
| 4.341 | 20.45 | 2 |
| 4.206 | 21.11 | 5 |
| *4.087 | 21.74 | 8 |
| *4.057 | 21.90 | 7 |
| 4.005 | 22.19 | 3 |
| *3.963 | 22.43 | 7 |
| *3.942 | 22.55 | 7 |
| 3.828 | 23.23 | 3 |
| *3.763 | 23.63 | 4 |
| **3.636 | 24.47 | 1 |
| 3.580 | 24.86 | 1 |
| *3.419 | 26.06 | 1 |
| *3.396 | 26.24 | 1 |
| 3.370 | 26.44 | 1 |
| 3.349 | 26.61 | 1 |
| *3.276 | 27.21 | 6 |
| 3.157 | 28.26 | 2 |
| 3.142 | 28.40 | 1 |
| 3.082 | 28.96 | 3 |
| 3.029 | 29.48 | 1 |

*diffraction lines identifying a crystal framework topology having pore windows formed by 18 tetrahedral members.
**diffraction lines of * plus additional intensity contribution from other crystalline phase.
***doublet.

*diffraction lines identifying a crystal framework topology having pore windows formed by 18 tetrahedral members. **diffraction lines of * plus additional intensity contribution from other crystalline phase. *** doublet.

TABLE 5B

| Interplanar d-Spacing (a) | Observed 2 × Theta | Relative Intensities I/I$_o$ |
|---|---|---|
| *16.447 | 5.37 | 100 |
| 13.352 | 6.61 | 1 |
| 10.757 | 8.21 | 1 |
| 9.476 | 9.33 | 1 |
| 9.085 | 9.73 | 1 |
| *8.206 | 10.78 | 14 |
| 6.686 | 13.24 | 1 |
| ***6.163 | 14.37 | 4 |
| 5.504 | 16.10 | 1 |
| *5.470 | 16.20 | 2 |
| 4.917 | 18.04 | 1 |
| *4.739 | 18.72 | 5 |
| 4.377 | 20.28 | 1 |
| 4.349 | 20.42 | 1 |
| 4.311 | 20.80 | 1 |
| 4.239 | 20.95 | 2 |
| 4.173 | 21.29 | 1 |
| **4.092 | 21.71 | 9 |
| **4.052 | 21.93 | 9 |
| 3.965 | 22.41 | 6 |
| **3.934 | 22.59 | 7 |
| 3.834 | 23.19 | 1 |
| **3.767 | 23.61 | 6 |

TABLE 5B-continued

| Interplanar d-Spacing (a) | Observed 2 × Theta | Relative Intensities I/I$_o$ |
|---|---|---|
| 3.668 | 24.26 | 1 |
| 3.633 | 24.50 | 2 |
| 3.581 | 24.86 | 2 |
| 3.421 | 26.04 | 1 |
| 3.405 | 26.16 | 1 |
| 3.365 | 26.48 | 1 |
| 3.328 | 26.78 | 1 |
| 3.313 | 26.90 | 1 |
| **3.277 | 27.20 | 9 |
| 3.161 | 28.22 | 2 |
| 3.129 | 28.52 | 1 |
| 3.079 | 28.99 | 4 |
| 3.054 | 29.24 | 1 |
| 3.023 | 96.54 | 2 |

*diffraction lines identifying a crystal framework topology having pore windows formed by 18 tetrahedral members.
**diffraction lines of * plus additional intensity contribution from other crystalline phase.
***doublet.

Note that the X-ray lines of Tables 1A, 1B and 1C remained upon calcination.

EXAMPLE 9

A two-phase synthesis reaction mixture was prepared with the organic phase comprised of 140 g Si (OC$_2$H$_5$)$_4$ and 840 g 1-hexanol, and the aqueous phase comprised of 322 g H$_3$PO$_4$ (85%), 196 g Al$_2$O$_3$, 140 g di-n-propylamine and 840 g of H$_2$O. The reaction mixture as a whole had a composition approximately 10% Si, 41% P and 49% Al, the percentages atomic. The directing agent was di-n-propylamine. Starting pH was 5.5.

The reaction mixture was treated as in Example 8 except that the time at 150° C. was limited to 20 hours. Ending pH was 7.

The crystalline product was separated from the reaction mixture by filtration, washed with toluene and ether and then dried. A sample of the product was then submitted for X-ray analysis and found to comprise the molecular sieve crystals having pore windows formed by 18 tetrahedral members of the present invention.

EXAMPLE 10

Forty-six grams of phosphoric acid (85%) were combined with 132.8 g of a silicic acid solution and 27.5 g of CATAPAL SB alumina hydrate. The silicic acid solution was prepared by continuously agitating a mixture of 41.8 g of tetraethylorthosilicate and 200 ml of water until dissolution occurred. That solution was concentrated to about 75 ml total volume on a rotary evaporator at room temperature and 0.05 mm pressure and subsequently diluted to 132.8 g total weight with water. After mixing the silicic acid solution with phosphoric acid and alumina, 20.3 g of di-n-propylamine was added, and the resulting mixture stirred well. This gel was transferred to a teflon-lined autoclave and heated without stirring at 196°–199° C. for 24 hours.

The solid product was filtered, washed with water, and air-dried at room temperature. A sample of the product was then submitted for chemical analysis and found to be comprised of:

3.83 wt. % C
0.94 wt % N
29.8 wt. % Al$_2$O$_3$
11.9 wt. % P
16.3 wt. % SiO$_2$

X-ray analysis proved the product to comprise crystals having a framework topology providing a diffraction pattern with interplanar d-spacings as shown in Tables 1A, 1B and 1C, without a significant interplanar d-spacing at 13.6–13.3 Angstroms.

EXAMPLE 11

A mixture containing 23 g of 85% orthophosphoric acid (H$_3$PO$_4$) in 50 g water was mixed with 10.31 g hydrated aluminum oxide (CATAPAL SB) and 3 g of silica gel. To this mixture was added 50.83 g tetrapropylammonium hydroxide (TPAOH 40%). Crystallization in an autoclave was at 150° C. at autogenous pressure for 64 hours. Table 6 shows the X-ray diffraction pattern of the product material which was calcined at 538° C. in N$_2$ for 2 hours.

TABLE 6

| Interplanar d-Spacing (A) | Observed 2 × Theta | Relative Intensities I/I$_o$ | |
|---|---|---|---|
| | | Total Composition | Large Pore Crystal Only |
| *16.484 | 5.36 | 20 | 100 |
| 14.164 | 6.24 | 17 | |
| 11.920 | 7.41 | 30 | |
| 8.970 | 9.86 | 9 | |
| *8.231 | 10.74 | 1 | 5 |
| 7.090 | 12.48 | 35 | |
| 6.869 | 12.88 | 8 | |
| 5.941 | 14.90 | 2 | |
| 5.691 | 15.56 | 2 | |
| 5.628 | 15.74 | 2 | |
| *5.463 | 16.22 | 1 | 5 |
| 5.119 | 17.32 | 3 | |
| 4.915 | 18.04 | 4 | |
| 4.742 | 18.71 | 2 | |
| 4.670 | 19.00 | 4 | |
| 4.489 | 19.77 | 13 | |
| 4.373 | 20.30 | 100 | |
| 4.239 | 20.05 | 47 | |
| 4.193 | 21.18 | 28 | |
| 4.143 | 21.44 | 65 | |
| ***4.118 | 21.57 | 18 | 90 |
| ***3.953 | 22.48 | 26 | 130 |
| 3.902 | 22.78 | 21 | |
| 3.868 | 22.99 | 48 | |
| 3.636 | 24.47 | 10 | |
| 3.552 | 25.06 | 6 | |
| 3.540 | 25.15 | 6 | |
| 3.427 | 25.99 | 9 | |
| 3.258 | 27.37 | 6 | |
| 3.218 | 27.71 | 10 | |
| 3.159 | 28.24 | 4 | |
| 3.118 | 28.62 | 8 | |
| 3.064 | 29.14 | 6 | |
| 3.005 | 29.72 | 14 | |

*diffraction lines identifying a crystal framework topology having pore windows formed by 18 tetrahedral members.
**diffraction lines of * plus additional intensity contribution from other crystalline phase. The overwhelming intensity contribution from other crystalline phases in the product of this example distorts relative intensity.

What is claimed is:

1. A process for converting feedstock comprising hydrocarbon compounds to product comprising hydrocarbon compounds of lower molecular weight than said feedstock hydrocarbon compounds which comprises contacting said feedstock at conditions for said conversion with catalyst comprising crystals having a framework topology after heating at 110° C. or higher giving an X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6–13.3 Angstroms.

2. A process for converting feedstock comprising hydrocarbon compounds to product comprising hydrocarbon compounds of lower molecular weight than said feedstock hydrocarbon compounds which comprises contacting said feedstock at conditions for said conversion with catalyst comprising crystals having a framework topology after heating at 110° C. or higher giving an X-ray diffraction pattern with interplanar d-spacings at 16.4±0.2, 8.2±0.1, 6.21±0.05, 6.17±0.05, 5.48±0.05, 4.74±0.05, 4.10±0.04, 4.05±0.04, 3.96±0.04, 3.94±0.04, 3.76±0.03 and 3.28±0.03 Angstroms, and without a significant interplanar d-spacing at 13.6–13.3 Angstroms.

3. A process for converting feedstock comprising hydrocarbon compounds to product comprising hydrocarbon compounds of lower molecular weight than said feedstock hydrocarbon compounds which comprises contacting said feedstock at conditions for said conversion with catalyst comprising crystals having a composition, on an anhydrous basis, as follows:

$$M_{x/m}{}^{m+}:(XO_2)_{1-y}{}^-:(YO_2)_{1-x}{}^+:(ZO_2)_{x+y}:\\ N_{y/n}{}^{n-}$$

wherein X is a +3 valence element, Y is a +5 valence element, Z is a +4 valence element, M is a cation of valence m, N is an anion of valence n, and x and y are numbers of from greater than −1 to less than +1 which satisfy the relationships:

(1) if x is 0, then y is not 0,
(2) if y is 0, then x is not 0, and
(3) x+y is greater than 0.001 and less than 1, said crystals having pore windows formed by 18 tetrahedral members.

4. The process of claim 3 wherein said crystals have a framework topology after heating at 110° C. or higher giving an X-ray diffraction pattern with interplanar d-spacings at 16.4±0.2 Angstroms, 8.2±0.1 Angstroms and 4.74±0.05 Angstroms, and without an interplanar d-spacing at 13.6–13.3 Angstroms.

5. The process of claim 3 wherein said crystals have a framework topology after heating at 110° C. or higher giving an X-ray diffraction pattern substantially as shown in Table 1B.

6. The process of claim 3 wherein said crystals have a framework topology after heating at 110° C. or higher giving an X-ray diffraction pattern substantially as shown in Table 1C.

7. The process of claim 4 wherein X is selected from the group consisting of aluminum, iron, chromium, vanadium, molybdenum, arsenic, antimony, manganese, gallium and boron; Y is selected from the group consisting of phosphorus, arsenic, antimony and vanadium; and Z is selected from the group consisting of silicon, germanium and titanium.

8. The process of claim 5 wherein X is selected from the group consisting of aluminum, iron, chromium, vanadium, molybdenum, arsenic, antimony, manganese, gallium and boron; Y is selected from the group consisting of phosphorus, arsenic, antimony and vanadium; and Z is selected from the group consisting of silicon, germanium and titanium.

9. The process of claim 6 wherein X is selected from the group consisting of aluminum, iron, chromium, vanadium, molybdenum, arsenic, antimony, manganese, gallium and boron; Y is selected from the group consisting of phosphorus, arsenic, antimony and vanadium; and Z is selected from the group consisting of silicon, germanium and titanium.

10. A process for converting feedstock comprising hydrocarbon compounds to product comprising hydrocarbon compounds of lower molecular weight than said feedstock hydrocarbon compounds which comprises contacting said feedstock at conditions for said conversion with catalyst comprising crystals having a framework topology after heating at 110° C. or higher giving an X-ray diffraction pattern with interplanar d-spacings at 16.4±0.2 Angstroms, 8.2±0.1 Angstroms and 4.74±0.05 Angstroms, and without a significant interplanar d-spacing at 13.6–13.3 Angstroms, said crystals having been synthesized by the method comprising:

(1) providing a reaction mixture comprising sources of X oxide, Y oxide and Z oxide, wherein X represents one or more elements of +3 valence selected from the group consisting of aluminum, iron, chromium, vanadium, molybdenum, arsenic, antimony, manganese, gallium and boron; Y represents one or more elements of +5 valence selected from the group consisting of phosphorus, arsenic, antimony and vanadium; and Z represents one or more elements of +4 valence selected from the group consisting of silicon, germanium and titanium, one of said oxide sources being unstable in water, an organic directing agent D, inorganic cations M and anions N, and a substantially water-immiscible organic solvent for said oxide source unstable in the water, the components of said reaction mixture having the following relationship:

$$(D)_a:(M_2O)_b:(X_2O_3)_c:(ZO_2)_d:(Y_2O_5)_e:(Solvent)_f:(N)_g:(H_2O)_h$$

where a, b, c, d, e, f, g, and h are numbers satisfying the following relationships:
a/(c+d+e) is less than 4,
b/(c+d+e) is less than 2,
d/(c+e) is less than 2,
f/(c+d+e) is from 0.1 to 15,
g/(c+d+e) is less than 2, and
h/(c+d+e) is from 3 to 150,
wherein upon initial provision of said reaction mixture said oxide source unstable in the water is dispersed or dissolved in the water-immiscible organic solvent;

(2) heating said reaction mixture at a rate of from 5° C. to 200° C. per hour to a temperature of from 80° C. to 300°;

(3) agitating said reaction mixture in a manner sufficient to intimately admix the water-immiscible organic solvent and the water with each other, thereby progressively hydrolyzing the oxide source unstable in water;

(4) maintaining said agitated reaction mixture at a temperature of from 80° C. to 300° C. and a pH of from 2 to 9 until said crystals are formed; and (5) recovering from said reaction mixture said crystals.

11. The process of claim 10 wherein said recovered crystals are characterized in the anhydrous states as follows:

$$D'_v:M_{x/m}{}^{m+}:(XO_2)_{1-y}{}^-:(YO_2)_{1-x}{}^+:(ZO_2)_{x+y}:N_{y/n}{}^{n-}$$

wherein D' represents the total of organic directing agent D plus organic solvent, v is the number of moles of D', m is the valence of cation M, n is the valence of anion N, and x and y are numbers of from greater than −1 to less than +1 which satisfy the relationships:

(1) if x is 0, then y is not 0,
(2) if y is 0, then x is not 0, and
(3) x+y is greater than 0.001 and less than 1,
said crystals having an ion exchange capacity of at least about 0.002 meq/g.

12. The process of claim 10 wherein D is selected from the group consisting of monoalkylamine, dialkylamine, alkyl being of 3 or 4 carbon atoms, and onium compounds having the formula:

$$R_4M^+X^- \text{ or } (R_3M^+R'M^+R_3)X_2$$

wherein R or R' is alkyl of from 1 to 20 carbon atoms, or combinations thereof; M is a tetracoordinate element; and X is an anion.

13. The process of claim 11 wherein D is selected from the group consisting of monoalkylamine, dialkylamine, alkyl being of 3 or 4 carbon atoms, and onium compounds having the formula:

$$R_4M^+X^- \text{ or } (R_3M^+R'M^+R_3)X_2$$

wherein R or R' is alkyl of from 1 to 20 carbon atoms, or combinations thereof; M is a tetracoordinate element; and X is an anion.

14. The process of claim 10 wherein said crystals have a framework topology giving an X-ray diffraction pattern substantially as shown in Table 1B.

15. The process of claim 10 wherein said crystals have a framework topology giving an X-ray diffraction pattern substantially as shown in Table 1C.

* * * * *